(12) United States Patent
Reimer et al.

(10) Patent No.: US 6,190,247 B1
(45) Date of Patent: Feb. 20, 2001

(54) APPARATUS FOR REMOVING BARNACLES FROM CRUSTACEAN SHELLS

(75) Inventors: Ernest M. Reimer; Paul Hearn, both of St. John's (CA)

(73) Assignee: Canpolar East Inc., St. John's (CA)

( * ) Notice: Under 35 U.S.C. 154(b), the term of this patent shall be extended for 0 days.

(21) Appl. No.: 09/369,341

(22) Filed: Aug. 6, 1999

(30) Foreign Application Priority Data

Aug. 24, 1998 (CA) ................................................ 2245414

(51) Int. Cl.[7] .................................................. A22C 29/04
(52) U.S. Cl. .................. 452/1; 452/12; 452/173
(58) Field of Search ................... 452/12, 1, 71, 452/86, 87, 88, 89, 90, 93, 173

(56) References Cited

U.S. PATENT DOCUMENTS

| 3,495,293 | 2/1970 | Tolley . | |
|---|---|---|---|
| 4,073,041 | 2/1978 | Davis et al. . | |
| 4,199,840 | * 4/1980 | Crane | 452/173 |
| 4,293,981 | 10/1981 | Smith . | |
| 4,446,601 | * 5/1984 | Carruthers | 452/12 |
| 4,479,284 | * 10/1984 | Tolley et al. | 452/1 |
| 4,503,586 | * 3/1985 | Lockerby et al. | 452/1 |
| 4,710,999 | * 12/1987 | Brunner et al. | 452/12 |
| 4,715,093 | 12/1987 | Lapeyre et al. . | |
| 4,752,988 | 6/1988 | Guglielmo et al. . | |
| 5,209,176 | 5/1993 | Pompei et al. . | |
| 5,261,854 | 11/1993 | Eiriksson . | |
| 5,401,207 | 3/1995 | Hicks et al. . | |
| 5,580,303 | 12/1996 | Winslow et al. . | |

FOREIGN PATENT DOCUMENTS

| 1205963 | 6/1986 | (CA) . |
| 1282917 | 6/1987 | (CA) . |
| 2015863 | 5/1991 | (CA) . |

* cited by examiner

Primary Examiner—Willis Little
(74) Attorney, Agent, or Firm—McFadden Fincham

(57) ABSTRACT

An apparatus for cleaning the shells of crabs and other crustacean and shellfish for removal of barnacles and other encrusted debris. A conveyor carries the shells through a cleaning station. The cleaning station features a rotating flail, having chains or other like flexible members for impacting against the shells with hard, smooth members for selectively shattering the barnacle shells while permitting the relatively softer crustacean shells to remain intact.

12 Claims, 5 Drawing Sheets

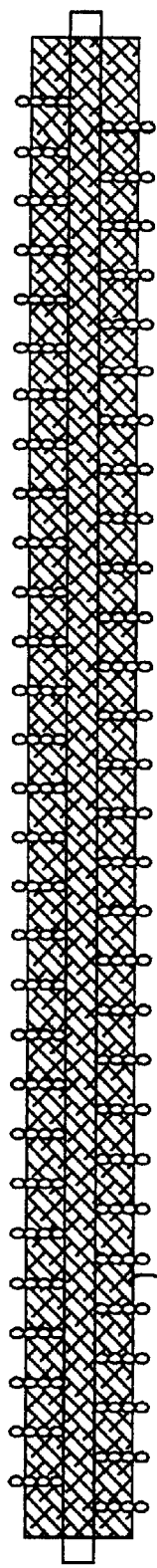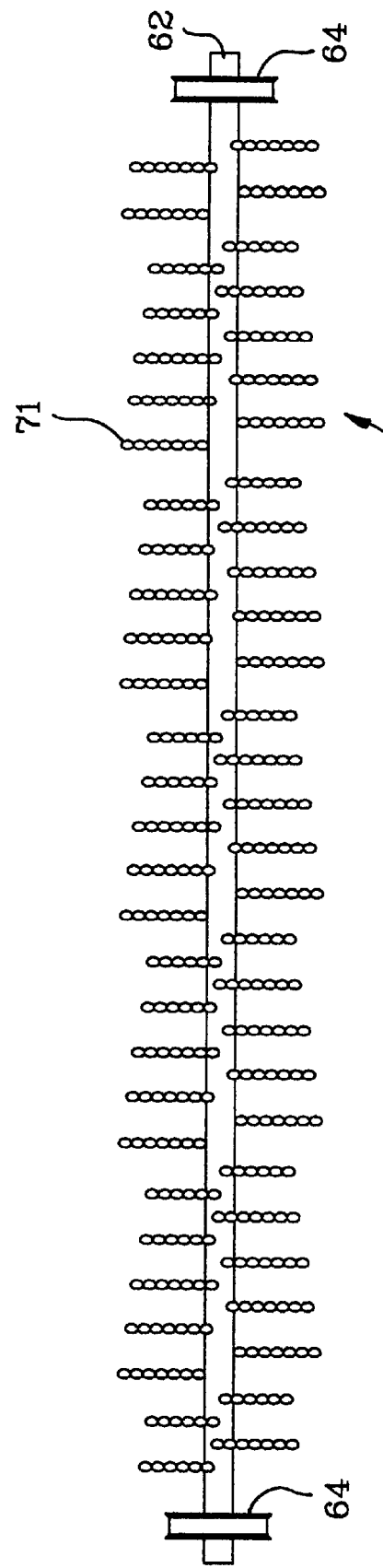

APPARATUS FOR REMOVING BARNACLES FROM CRUSTACEAN SHELLS

FIELD OF THE INVENTION

The present invention relates to shellfish and crustacean processing apparatus and methods. In particular, it relates to an automated apparatus for cleaning the shells of crab and other crustaceans and shellfish, specifically for removal of barnacles and other like encrusted debris.

BACKGROUND OF THE INVENTION

Crustacean meat and in particular crab leg meat is commonly sold for human consumption in an "the shell" form. It is important from a marketing perspective that the exterior surfaces of the shell be cleaned and free of debris. The upper sides of crab legs, i.e., the side that faces upwardly when the crabs are in their normal crawling position, normally is red in color. This color is imparted by a relatively delicate layer on the crab shell, which is easily abraded away during cleaning and processing. It is important from a commercial perspective that the red layer be left substantially intact and unblemished, and that it also be clean and free of slime, slub and other debris.

Applicants' co-pending Canadian Patent application numbers 2,206,678 and 2,234,034 relate to apparatus for cleaning the shells of crustaceans, and in particular for cleaning crab legs. This apparatus is substantially fully automated, whereby an operator positions individual crabs on a conveyor apparatus, with the crabs being suspended from hooks. The crab legs are automatically cleaned as they are conveyed through a cleaning station having a pair of elongate, counter-rotating brushes between which the crab legs are passed. The brushes described in applicants' said co-pending applications comprise generally conventional bristle-bearing brushes, which are affective for removal of most foreign objects and debris from the other crab leg sections. However, the shells of crab and other crustaceans frequently have encrusted on them barnacles or other like foreign objects which very firmly adhere to the shells and cannot be removed by conventional brushes. Barnacles in particular are difficult to dislodge but must be removed if the seafood is to be saleable. Barnacles represent a particular problem in some catch locations. Crab legs are typically contaminated with barnacles on the upper (red) sides of the legs, and this presents both a commercial imperative to remove the barnacles from this most visible of locations, and a technical challenge to remove the barnacles without abrading or otherwise damaging the relatively delicate red layer. The barnacles can vary in size from approximately 2 mm to 10 mm in diameter. The concentration of barnacles that are attached to the shell varies depending on catch location.

The current method for removal of barnacles and the like consists simply of manual removal with a knife or other scraping tool. In this method, the barnacles are normally removed one at a time, and the method is correspondingly slow, labor intensive and expensive.

The cleaning apparatus of applicants' co-pending Canadian applications remove a portion of barnacles from crab leg shells. Typically, between three and five percent of barnacles are removed by this apparatus. Accordingly, it is desirable to provide an effective automated barnacle removal apparatus.

Various cleaning apparatus have been proposed for removal of debris from crustacean and shellfish shells. For example, Canadian Patent 2,015,863 (Tillion) discloses an apparatus for cleaning mussel shells, with the cleaning being performed by an array of abrasive rollers that also serve to transport the mussels between components of the system. Canadian Patent 1,205,963 (Lockerby) discloses apparatus for cleaning crab shells by means of an array of chain-mounted brushes that brush debris from the crab bodies.

The present invention relies for its operation on the convenient fact that barnacle shells are relatively hard and brittle, while crab shells are relatively resilient. Accordingly, a percussive force may be used to shatter or break off a barnacle from a crab shell, while leaving the crab shell substantially undamaged. Properly applied, a percussive force is capable of removing all or substantially all barnacle shells from crab shells, while causing minimal damage or abrasion to the crab shells.

SUMMARY OF THE INVENTION

While the present invention is specifically adapted for use with crab leg or body sections, it will be seen that with suitable modifications, the invention may be used to remove barnacles or other hard encrustations from the shells of other crustaceans or shellfish, provided such crustaceans or shellfish have a shell that is relatively resilient in comparison with typical barnacle shells.

The present invent has as its object the provision of an improved apparatus and method for removing barnacles and other encrusted debris from crab and other crustacean and shellfish shells. It is a further object to provide an automated apparatus that employs percussive force against the debris to shatter or dislodge the debris.

These and other objects will be clarified and fully disclosed by way of the examples described herein.

The present invention comprises in one aspect a processing apparatus for removing barnacles or other like encrusted relatively hard debris from crustacean shells. The apparatus may be used to clean shells that are resilient relative to the barnacles.

The apparatus comprises in its broadest aspect:

retention means for holding a selected crustacean or part thereof; and percussive impact means for applying a repeated percussive force against the crustacean shell, sufficient to substantially dislodge or shatter the debris while leaving the crustacean shell substantially undamaged.

Preferably, the percussive impact means comprises a rotatably driven shaft, drive means for rotating the shaft, and at least one elongate flexible flail attached to the shaft for repeated impact against said shells. The flail is characterized by an array of hard, smooth members for impacting against and shattering or dislodging the debris upon rotation of the shaft.

The flail may comprises a chain comprised of links or connecting beads.

Conveniently, the retainer means comprises a conveyor for retaining crustaceans and conveying the crustaceans through a cleaning station which incorporates the impact means. Crustacean shells are conveyed forwardly and upwardly by the conveyor for progressive cleaning from an upper region of the crustacean to a lower region thereof.

The invention comprises in a further aspect a method for removal of barnacles or other hardened debris from crustacean or shellfish shells, comprising the steps of:

selecting barnacle or debris-encrusted crustaceans, whereby the crustacean shell is resilient relative to the barnacles or other debris;

fixedly supporting the crustacean or shellfish by means of a retaining means; and imparting a repeated percussive force against the debris with percussive impact means, whereby the barnacles or other like debris are shattered or dislodged and the crustaceans remain substantially undamaged. The retainer means and percussive impact means are preferredly as characterized above.

Preferably, the method is specifically adapted for removing barnacles from crab legs featuring an upper red side, and whereby the percussive means contact only the red sides of the crab legs. The method and apparatus may also be adapted for contacting both the upper and lower sides of the crab legs. The lower, white side will typically also bear a few barnacles, although in substantially lower numbers.

The term "crustacean" as used herein also includes shellfish that meet the criteria identified above.

DESCRIPTION OF THE DRAWINGS

FIG. 4 is a side elevational view of the portion shown in FIG. 3;

FIG. 6 is a view as in FIG. 4, of the second embodiment.

DETAILED DESCRIPTION OF THE PREFERRED EMBODIMENTS

Figure 1:
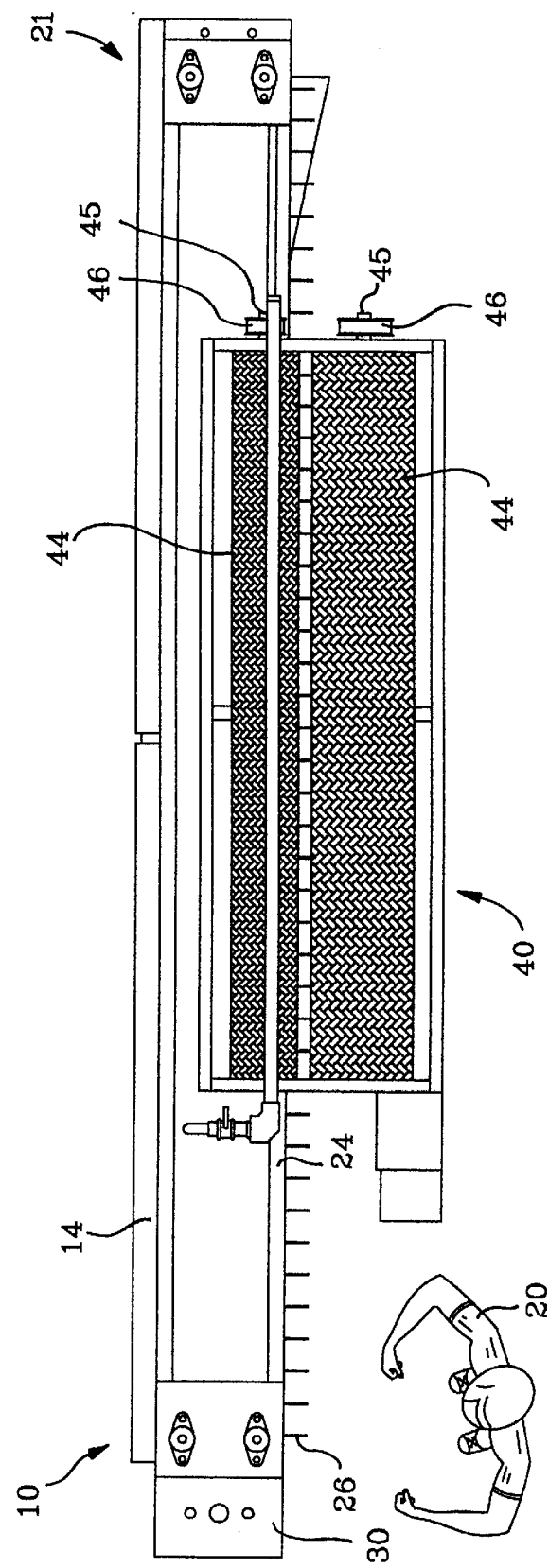
FIG. 1 is a side elevational view of an automated apparatus for cleaning and severing of crab legs according to the present invention.
Figure 2:
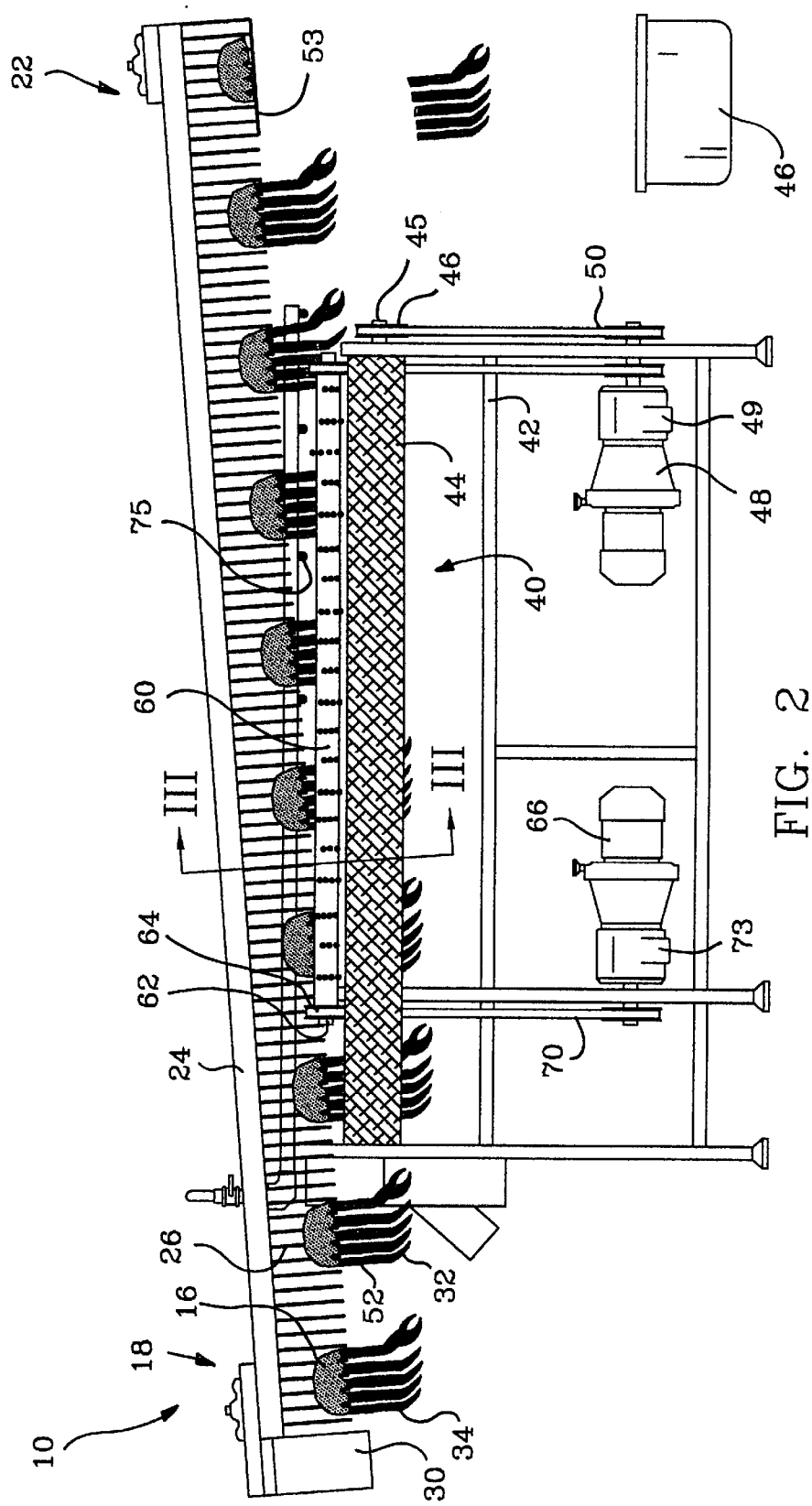
FIG. 2 is a plan view from above of the apparatus shown in FIG. 1.

FIGS. 1 and 2 illustrate a preferred environment of the present invention, namely an automated system for cleaning crab legs and removing the cleaned legs from the crab body. This apparatus is designated globally as 10 and features a conveyer 14 for transporting crabs 16 through the system. The conveyor slopes upwardly from its intake end 18 where crabs are placed on the conveyor by an operator 20, to its opposed outlet end 22. The conveyor comprises an endless belt 24, from which an array of crab engagement hooks 26 depend. The conveyor is driven at a controlled speed by drive means 30, which may comprise any conventional drive means known to the art.

Each crab body 16 is suspended from the hooks such that its legs 32 dangle freely downwardly. The crabs are arranged in this device by the operator 20 such that the red sides 34 of the crab legs all face to same lateral side of the device when the crabs are suspended from the conveyor.

The conveyor 14 transports the crabs through a cleaning station 40, comprising a frame 42 and a pair of spaced apart, elongate rotatably driven brushes 44 supported within the frame for cleaning the crab legs 32 of mud and other debris. The brushes are mounted in a generally horizontal orientation. The brushes 44 each have as their core a shaft 45 journalled at either end for rotation within bearing blocks 46 supported by the frame 42. An electric motor 48, linked to each brush shaft 45 by a gearbox 49 and a corresponding belt 50, rotatably drives the brushes at a controllable speed. The crabs 16 are conveyed through the cleaning station by the conveyor 14 such that the crab legs pass between the opposed counter-rotating brushes. The brushes are positioned to contact respective opposed sides of the crab legs, and to progressively clean the legs from top to bottom as the individual crabs are transported through the cleaning station forwardly and upwardly by the conveyor. The brushes rotate in opposite directions from each other whereby the facing sides of the brush move downwardly to pull the crab legs passing between there downwardly. The brushes are spaced apart sufficiently to permit the counter-rotation of the brushes to tension the legs somewhat, thereby fully extending the legs for optimal contact with the brushes and barnacle clean means, described below. The cleaning station further includes water spray mean, (not shown) for washing away the debris loosened by the brushes.

After the crabs are conveyed through the cleaning station, a cutter 53 removes the cleaned legs from the crab body, and the body and severed legs are conveyed to separate receptacles, not shown. The cleaning station 40 includes a means for the application of repeated percussive force to the crab leg sections, and in particular to barnacles and other hard encrustaceans on the shells, for the removal of barnacles. Since barnacles 52 are typically concentrated on the upper (red) surfaces 34 of the legs 32 percussive impact need be supplied only to this surface. In the preferred version, percussive force is applied by means of a rotatable flail bar 60 specifically adapted for this purpose, whereby individual flails impact on the crab sections with percussive force as the flail bar rotates. The flail bar is mounted parallel to and either above or below the counter-rotating cleaning brushes. The flail bar 60 comprises an elongate rotatable structure, having a central shaft 62, rotatably journalled within bearing blocks 64, and rotatably driven by a motor 66 linked by belt 70 and gearbox 73 to the shaft 62. Conveniently, the motor is a variable speed electric motor and with the gearbox, rotates the flail bar at between 2 and 10 RPM. Conveniently, the direction of rotation of the flail bar permits the individual flails 71 (described below) to contact the crab leg 32 in a downwards direction. The flail bar is positioned such that the flails 71 contact the upper, red, face 34 of crab legs. The biasing pressure exerted by the flails as they act upon the crab legs is resisted by a back stop mounted to the frame, comprising a bar 75 extending the length of the cleaning station, against which the crab legs slide as they are transported through the cleaning station.

Figure 3:
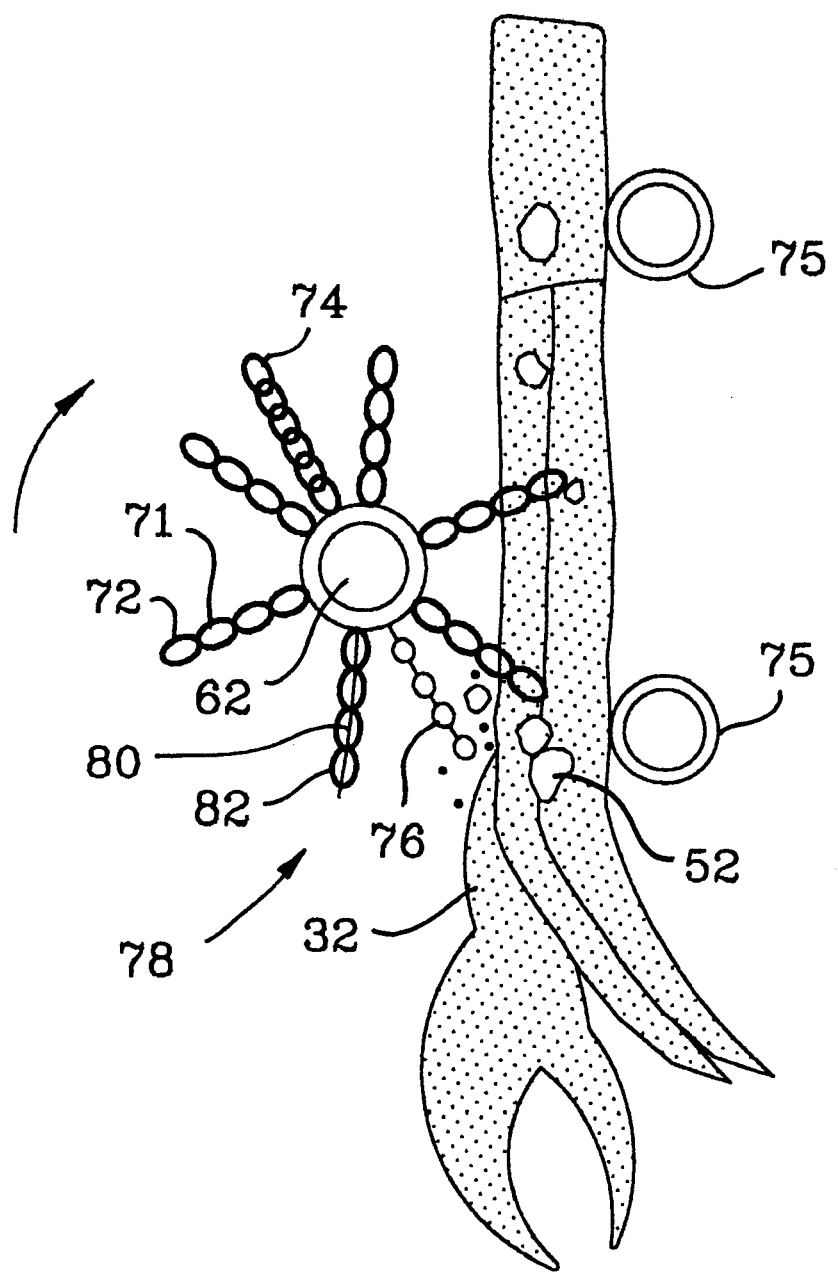
FIG. 3 is a front elevational view of a portion of the apparatus shown in FIG. 1, illustrating a barnacle removal flail according to the present invention.

The flail bar 60, shown in detail in FIGS. 3 and 4, features flexible flails 71 extending from the central shaft 62. For impact with the barnacles 52, hard protruding member 72 are positioned on the flails. For this purpose, the flails may comprise multiple short lengths of chain, such as steel or hard plastic chain. The chain may comprise either conventional links 74 or a connected array of beads 76. Alternatively or in addition, the flails may comprise flexible beaded bristles 78 comprising a relatively flexible bristle core 80, bearing hard plastic or metal beads 82. For illustration, all of the above types of flails are shown; in use, the flail would normally employ only a single type of construction. In one preferred version, the chain comprises bead chain featuring a core diameter of about 2 mm and a link outside diameter of about 10 mm. The chain lengths may be mounted to the central shaft in a staggered array to provide complete "coverage" of the crab leg as the flail bar is rotated and the crabs are conveyed through the cleaning station.

In operation, rotation of the flail bar 60 results in repeated percussive impact of the chained sections against substantially all portions of the upper face 34 of the crab section 37, resulting in a shattering or dislodging of substantially all barnacles 52 attached to the crab shell. The crab shell, which is relatively resilient, remains substantially free of shattering. The chain length and link size of the flails, as well as the rotational speed of the flail bar 60, are all selected to provide a degree of impact against the crab section that removes or shatters substantially all of the barnacles attached thereto, while leaving the crab shells substantially undamaged.

Figure 5:
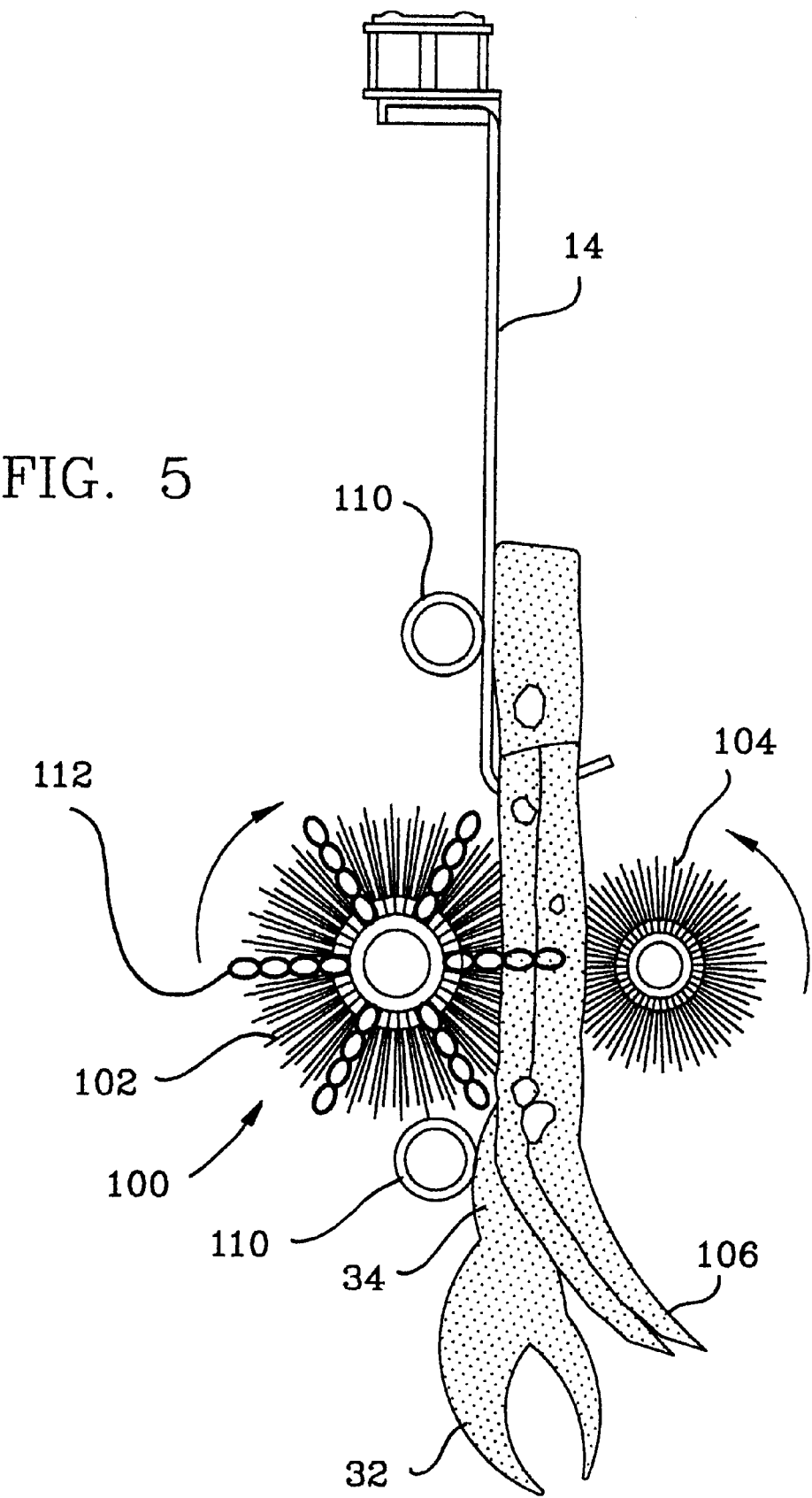
FIG. 5 is a view as in FIG. 3, showing a second embodiment of the invention.

A second embodiment is shown in FIG. 5 and 6. In this version, the flail bar 100 is integral with one of the paired counter rotatable cleaning brushes 102. In this version, the integral brush and flail bar 102 is selected and positioned for contact with the upper, red face 34 of the crab leg 32. Conveniently, this brush may have bristles that are longer and softer than the opposed brush 104 intended for contact with the lower, white face 106 of the crab leg to avoid excessive abrasion of the red layer. The arrangement permits a thorough scrubbing of the generally more heavily soiled lower white side of the crab legs through the use of the stiffer bristles, with the softer bristles minimizing abrasion to the red layer. As seen in FIG. 5, the crab legs 32 and hook conveyor 14 respectively contact and slide along a pair of spaced apart guide rails 110 to maintain the even spacing of the crab section between the respective brushes 102, 104 as the crabs are conveyed through the cleaning station. The first, polishing brush 102 for contact with the upper face of the crab section incorporates multiple flails comprising short lengths of chain or beaded bristles 112, with the chain or beaded bristles being essentially as characterized above in connection with the first embodiment. Conveniently, the chain or beaded bristles are longer than the polishing bristles 114 in order to better impact against the barnacles without interference from the shorter polishing bristles.

In operation, this embodiment operates in an essentially identical manner as the first version, whereby rotation of brush 102 impacts the flails 112 against the crab legs, progressively from the top to bottom ends, as the crabs are conveyed forwardly an upwardly, through the cleaning station.

It will be seen that although the present invention has been specifically described by way of preferred embodiments thereof, numerous departures from and variations to these embodiments may be made by one skilled in the art, without departing from the spirit and scope of the invention as defined by the claims set forth in this patent specification.

What is claimed is:

1. A processing apparatus for removing barnacles or other like encrusted relatively hard debris from crustacean shells, said shells being resilient relative to said barnacles, said apparatus comprising:

retention means for holding a selected crustacean or part thereof, and percussive impact means for applying a repeated essentially percussive force against said crustacean shell without brushing, sufficient to substantially dislodge or shatter said debris while leaving said crustacean shell substantially undamaged.

2. Apparatus as claimed in claim 1 wherein said percussive impact means comprises a rotatably driven shaft, drive means for rotating said shaft, and at least one elongate flexible flail attached to said shaft for repeated impact against said shells, said flail characterized by an array of members for impacting against and shattering or dislodging said debris upon rotation of said shaft.

3. An apparatus as claimed in claim 2, wherein said flail comprises a chain comprised of links.

4. Apparatus as claimed in claim 2, wherein said flail comprises a chain comprised of connecting beads.

5. Apparatus as claimed in claim 1, wherein said retention means comprises a conveyor for retaining crustaceans and conveying said crustaceans through a cleaning station, said cleaning station incorporating said impact means.

6. Apparatus as claimed in claim 5, wherein said impact means comprises flail means, comprising an elongate rotatable shaft drive, drive means for rotating said shaft, and an array of flexible flails on said shaft having an array of members for contacting said crustaceans with percussive force upon rotation of said shaft, said conveyor and said shaft being angled relative to each other whereby crustacean shells are conveyed forwardly and upwardly relative to said shaft by said conveyor for progressive cleaning from an upper region of said crustacean to a lower region thereof as said crustaceans are conveyed through said cleaning station.

7. Apparatus as claimed in claim 6, wherein said cleaning station further comprises a pair of elongate counter rotatable brushes, and drive means for rotating said brushes in opposing directions, said brushes positioned to contact said crustaceans on opposing sides thereof for cleaning of debris and polishing of said shells, and wherein said conveyor diverges relative to said brushes for progressive cleaning of said crustaceans from an upper to a lower region thereof as said crustaceans are conveyed through said cleaning station.

8. An apparatus as claimed in claim 7, wherein at least one of said counter rotating brushes incorporates said flail means.

9. A method for removal of barnacles or other hardened debris from crustacean or shellfish shells, said method comprising the steps of:

selecting barnacle or debris-encrusted crustaceans, whereby the crustacean shell is resilient relative to said barnacles or other debris;

fixedly supporting said crustacean or shellfish by means of a retaining means; and imparting a repeated essentially percussive force against said debris with percussive impact means without brushing, whereby said barnacles or other like debris are shattered or dislodged and said crustaceans remain substantially undamaged.

10. A method as claimed in claim 9, wherein said percussive impact means comprises a flail means comprising a rotating member having an elongate axis, a rotatable shaft coaxial with said elongate axis, drive means for rotating said shaft, and one or more flexible flails engaged to said shaft, said flails comprising an array of members for contacting said barnacles or debris, said step of imparting a percussive force comprising the step of rotating said shaft with said drive means whereby said flails repeatedly contact said debris with a percussive force sufficient to shatter or dislodge said debris.

11. A method as claimed in claim 10, comprising the further step of conveying said crustaceans by conveyor means through a cleaning station, said conveyor means carrying said crustaceans through said cleaning station forwardly and upwardly relative to the elongate axis of said flail means, whereby said flails progressively contact said crustacean or shellfish from an upper region to a lower region.

12. A method as claimed in claim 9, specifically adapted for removing barnacles from crab legs featuring an upper red side, and whereby said percussive means contact only said red sides of said crab legs.

\* \* \* \* \*